United States Patent [19]

Hatsuzaki et al.

[11] Patent Number: 4,744,193
[45] Date of Patent: May 17, 1988

[54] METHOD OF SEALING WATER LEAKAGE IN CONCRETE STRUCTURES

[75] Inventors: Toshio Hatsuzaki, Kanagawa; Yoshihiko Ogawa, Tokyo; Toshio Hiramatsu, Tokyo; Hideo Senga, Tokyo; Takehiko Tokoro, Saitama, all of Japan

[73] Assignees: Taisei Corporation; Nisshinboseki Kabushiki Kaisha, both of Tokyo, Japan

[21] Appl. No.: 927,469

[22] Filed: Nov. 6, 1986

[51] Int. Cl.$^4$ ............ E02D 31/02; E02D 37/00
[52] U.S. Cl. .................. 52/744; 52/169.7; 52/169.14; 52/309.4; 405/264
[58] Field of Search ............ 405/264; 521/905; 52/309.3, 169.7, 514, 309.4, 169.14, 744; 264/DIG. 13; 166/295

[56] References Cited

U.S. PATENT DOCUMENTS

| | | | |
|---|---|---|---|
| 3,210,300 | 10/1965 | Leibu | 264/DIG. 13 |
| 3,334,557 | 8/1967 | Fitzgibbon | 52/309.5 |
| 3,637,019 | 1/1972 | Lee | 166/295 |
| 3,783,624 | 1/1974 | Nakade | 405/264 |
| 3,878,686 | 4/1975 | Hageman | 166/295 |
| 3,894,131 | 7/1975 | Speech | 521/905 |
| 3,953,406 | 4/1976 | Marsh | 521/905 |
| 4,165,413 | 8/1979 | Sefton | 52/128 |
| 4,275,172 | 6/1981 | Barth | 521/112 |
| 4,315,391 | 2/1982 | Piazza | 52/309.5 |
| 4,360,494 | 11/1982 | Hodges | 52/744 |

Primary Examiner—John E. Murtagh
Attorney, Agent, or Firm—Armstrong, Nikaido, Marmelstein & Kubovcik

[57] ABSTRACT

A mixture consisting essentially of (1) an organic polyisocyanate compound and/or a prepolymer having terminal isocyanate residues, which is derived from the reaction of an organic polyisocyanate with a polyhydroxyl compound, and (2) 2-pyrrolidone, is injected for grouting into water-leaking cracks or openings of concrete structures such as water tanks, subway constructions and tunnels. The injected mixture diffuses into the cracks or openings and is cured in short time by reacting with water at the leaking sites. The resultant polyurethane foam securely seals the water leaking sites.

5 Claims, 5 Drawing Sheets

METHOD OF SEALING WATER LEAKAGE IN CONCRETE STRUCTURES

BRIEF SUMMARY OF THE INVENTION

The present invention relates to the method of sealing cracks or openings to stop water leaks in concrete structures such as water tanks, subway constructions and tunnels by filling the leaking sites with a unique grouting material.

(1) Conventional Methods

In concrete structures, cracks or openings appear because of various factors such as inappropriate constructions, changes in atmospheric temperature or humidity, differential settlement due to load change, and alkali-aggregate reaction.

Under these circumstances, various types of grouting materials are conventionally used for sealing. The major categories of the materials are:

(a) Water-glass-containing chemicals
(b) Acrylamide-containing resins
(c) Cement milk and cement mortar
(d) Hydration-type (water-reactive) polyurethane foams

(2) PROBLEMS THAT THE PRESENT INVENTION IS TRYING TO SOLVE

The above mentioned grouting materials have the following disadvantages:

(a) Grouting by water-glass-containing chemicals is generally poor in durability and not suitable for a semipermanent sealing purpose.

(b) Acrylamide-containing resins are poor in flexibility and are not sufficiently cured in the presence of water.

(c) Materials containing cement or mortar require relatively a long time for curing. Consequently, the grouting materials tend to be washed away with leaking water before curing is substantially carried out.

(d) In the use of conventional polyurethane foams, most of air cells formed in the foams cured by the hydration reaction tend to be open and retain excess water. Consequently, the resultant polyurethane sealings are frail and moreover, water leaks out through the water-retaining cells when the water pressure is high. Further, under a drying atmosphere, cured polyurethane foams shrink due to the loss of retained water in the open cells of the foams and are stripped away, losing adhesion, from the leaking sites, resulting in water leakage.

(3) OBJECT OF THE INVENTION

An object of the present invention is to provide a novel method of sealing of water-leaking cracks and openings in concrete structures.

(4) MEANS TO SOLVE THE PROBLEMS

Under these circumstances, the present inventors have made extensive efforts in quest of new grouting materials with a view to providing a method to securely stop water leakage in concrete structures. The efforts have led to the development of a novel method, in which an mixture consisting of (1) an organic polyisocyanate compound and/or a prepolymer having terminal isocyanate residues, which is derived from the reaction of an organic polyisocyanate with a polyhydroxyl compound and (2) 2-pyrrolidone is injected for grouting into water-leaking cracks or openings of concrete structures. More specifically, finding of the use of 2-pyrrolidone has made it possible to provide an excellent material having such features required for sealings as short curing time, stoutness and ahesiveness.

DETAILED DESCRIPTION

(1) Materials for grouting

Figure 1:
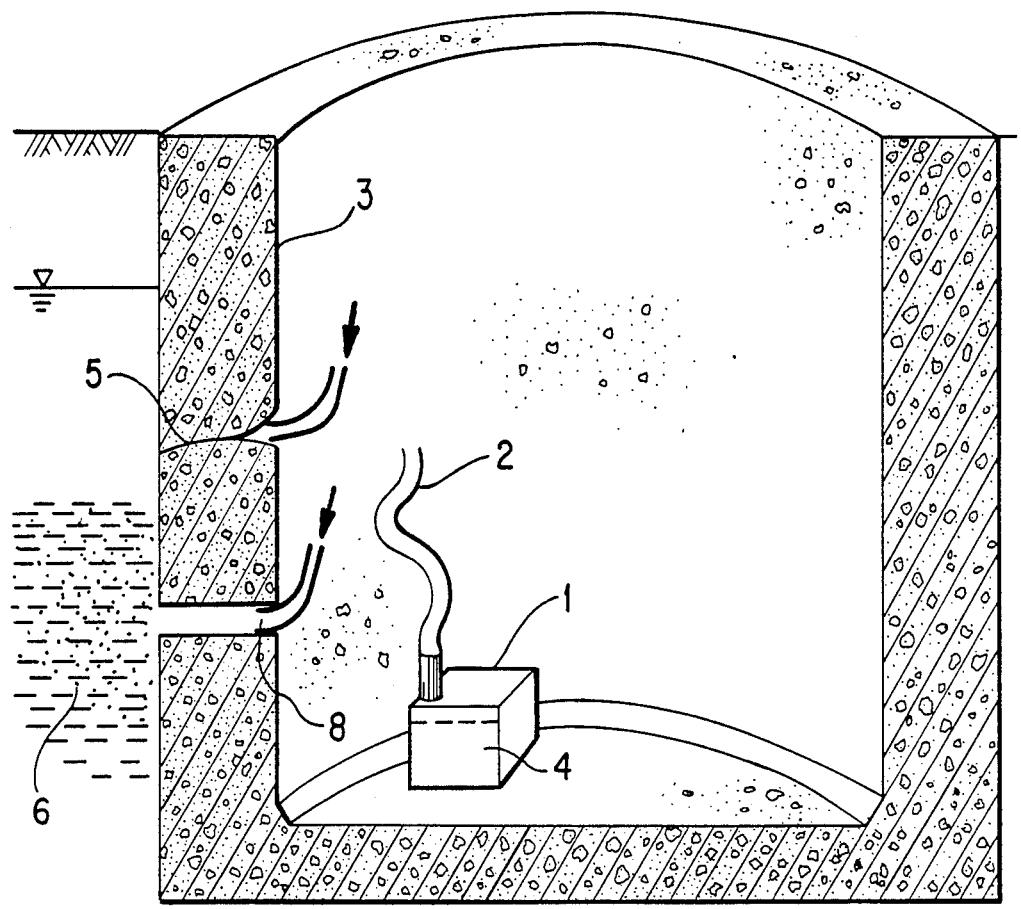
FIG. 1 is an illustration for the method of sealing openings in a structure described in Example 1.

Primary ingredients: Isocyanates to be used as primary ingredients in the present invention are, for example, organic polyisocyanates such as polymethylene-polyphenyl (Crude MDI), diphenylmethane-diisocyanate (MDI) and toluylene-diisocyanate (TDI), and/or prepolymers having terminal isocyanate residues, which are derived from the reactions of above mentioned organic polyisocyanates with polyhydroxyl compounds having hydroxyl residues.

Catalyst: A catalyst to be used in the present invention is 2-pyrrolidone. This agent acts not only as a catalyst to accelerate curing by hydration reaction but also as an excellent hydrophilic solvent.

Surface-active agents: Surface-active agents to be used, if necessary, in the present invention as foaming controlling agents are, for example, silicone surfactants.

The mixing ratios for the primary ingredients to the catalyst are 100: (5 to 50) by weight, preferably 100: (20 to 40).

(2) Sealing method

A grouting mixture consisting essentially of the primary ingredients, or isocyanates, the catalyst and, if necessary, other ingredients such as surfactants and pigments is put into an injection pump. The grouting mixture may be prepared at a working site by mixing the individual ingredients. The grouting mixture may also be prepared in the form of premix which enables easy handling and transporation, since the mixture is not to be cured unless water is present. The premix can be stored in a container tightly sealed with nitrogen gas or dry air to avoid water. The grouting mixture is then injected through an injection pipe into a leaking site. Modifications in sealing methods at the leaking sites are possible as will be described in the Examples. Polyurethane foams with relatively high expansion ratios (volume of cured polyurethane foam / volume of starting material) is obtainable by the use of the grouting material according to the present invention, the expansion ratios ranging from 2 to 120. Adoption of adequate expansion ratios, approximately from 10 to 100, result in producing polyurethane foams having sufficient adhesiveness to the concrete structures to assure effective sealing.

More detailed description for the method of sealing water leakage in concrete structures according to the present invention will be given as follows with Examples.

EXAMPLE 1

Polymethylene-polyphenyl-polyisocyanate (Crude MDI), 100 parts by weight, 2-pyrrolidone, 30 parts by weight, and silicone surfactant, 1 part by weight, were mixed for 20 seconds in a container to prepare a grouting mixture 4 and the mixture was put into a grout pump 1. The grouting 4 was injected to a leaking site of a structure 3 through a supply hose 2 which was connected to the grout pump 1 at one end and inserted into the leaking site at the other end (FIG. 1).

Alternately, as shown in the lower half of the FIG. 1, boring was made at a leaking site 5 and the grout was injected into the boring through an injection pipe 8 fixed at the opening of the boring. The grout 4 thus injected ran through the boring and gradually reached the other end of the boring. Curing of the grout was completed in about 2 minutes to stop water leakage. The specific gravity of the resultant polyurethane foam was 0.03 (expansion ratio of 30) and has cells mostly closed. This boring method is specifically useful when the cracks at leaking sites are minor and thin.

Figure 2:
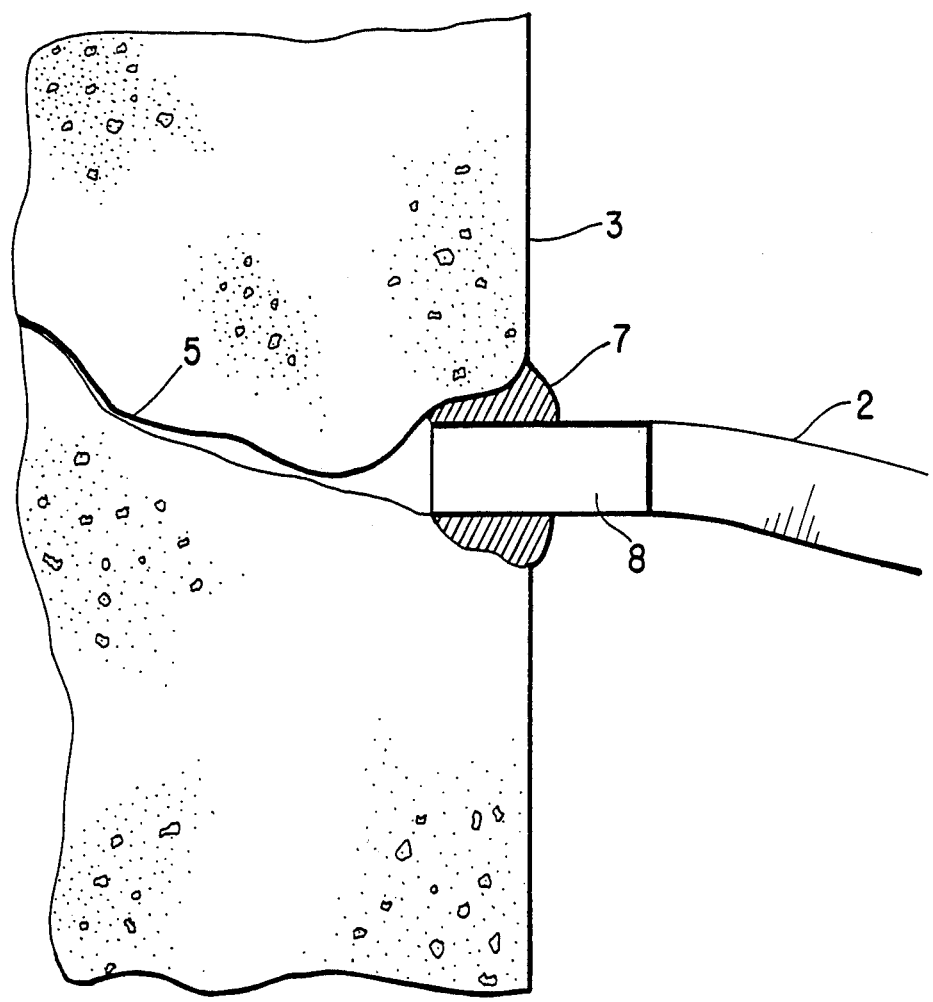
FIG. 2 is an illustration for a connection of an injection hose to a structure.
Figure 3:
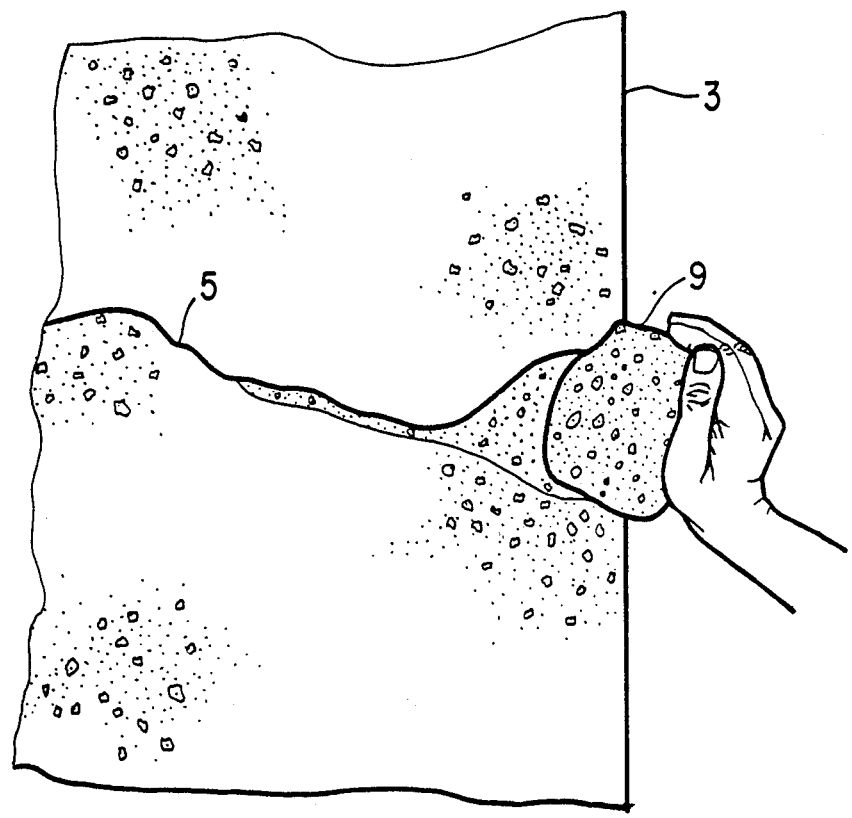
FIGS. 3, 4 and 5 are illustrations for sealings described in Examples 2, 3, and 4.

Alternately, a V-cut was made at the cracking site 5 and the injection pipe 8 was placed in the cut, the pipe end at the V-cut was fixed by using mortar 7 or the like (FIG. 2).

EXAMPLE 2: (FIG. 3)

A piece of a flexible and porous material 9 soaked with the grouting mixture in the present invention was pushed into an opening which had been expanded by making V-cut as described in the Example 1. The grouting mixture soaked in the porous material was cured in short time, thus the quick and effective sealing was expected solely by pressing the grout-soaked porous material against the V-cut opening. The flexible and porous materials to be used in the present invention are sponges, clothes or the like.

EXAMPLE 3

A sealing covering a relatively extended area of a concrete structure is needed when thin and long cracks occur or when a concrete structure is locally porous mostly due to poor mixing which results in localization of excessive aggregates associated with an insufficient amount of mortar.

Figure 4:
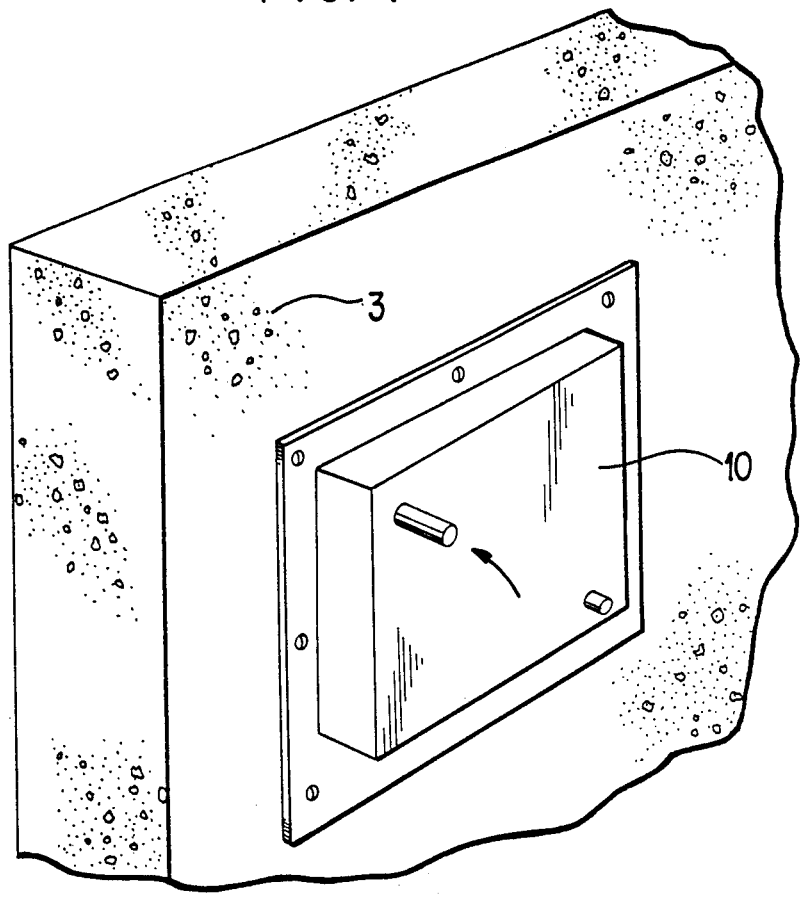

FIG. 4 illustrates an example of such a case, where a cover 10 was placed over the area of cracks and was fixed temporarily on the surface of the structure. The grouting mixture in the present invention was injected into the interior of the cover through an injection pipe connected to the cover and was cured in short time by reacting with water. The resultant polyurethane foam was effectively stopped the water leakage of the covered area.

EXAMPLE 4

Figure 5:
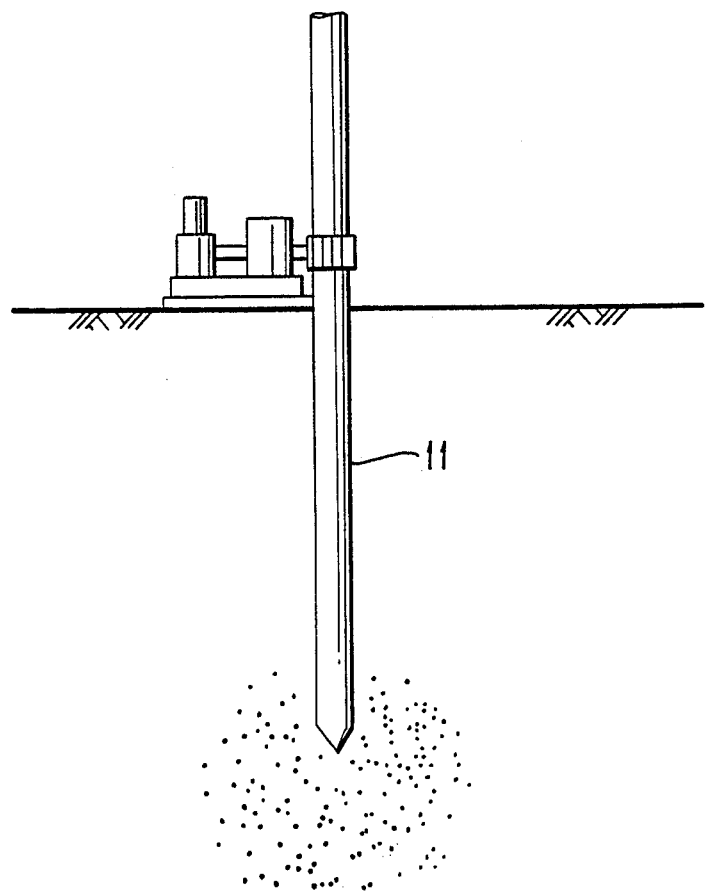

The grouting mixture in the present invention is also useful in areas of porous geologic structures such as peat bed. The grouting is to be carried out in the same manner as in conventional grouting. FIG. 5 illustrates injection of the grouting mixture by using an injection pipe 11.

(3) Effects of the Invention

Accordingly, above described grouting method in the present invention brings about the following effects:

(1) The grouting mixture according to the present invention is injected into openings or cracks at water leaking sites and is cured in short time to form polyurethane foam having numerous closed cells which retain minimum amount of water. Consequently, the polyurethane sealings thus formed are stout and securely stop the water leakage. Further, loss of adhesion due to shrinkage by drying can be prevented.

(2) The expansion ratios of polyurethane foams cured according to the present invention can be within the desirable ranges which result in excellent adhesiveness to concrete structures to assure effective sealing.

What we claim is:

1. A method of sealing water leakage in concrete structures which comprises: injecting a grouting mixture consisting essentially of (1) an organic polyisocyanate compound and/or a prepolymer having terminal isocyanate residues, which is derived from a reaction of an organic polyisocyanate with a polyhydroxyl compound and (2) 2-pyrrolidone into openings or cracks at a leaking site of a concrete structure and curing said grouting mixture by hydration reaction to form polyurethane foam to stop the water leakage.

2. The method as claimed in claim 1, wherein mixing ratios for the organic polyisocyanate compound and the prepolymer to 2-pyrrolidone, are 100: 5 to 50 by weight.

3. The method as claimed in claim 1, wherein said grouting mixture is prepared in the form of a premix.

4. The method as claimed in claim 1, wherein expansion ratios for polyurethane foam cured are within the range of 2 to 120.

5. The method as claimed in claim 1, further comprising the steps of covering areas including said openings and cracks with a cover which is temporarily fixed on said concrete structure and injecting the grouting mixture into the interior of said cover.

* * * * *